Figure 1:
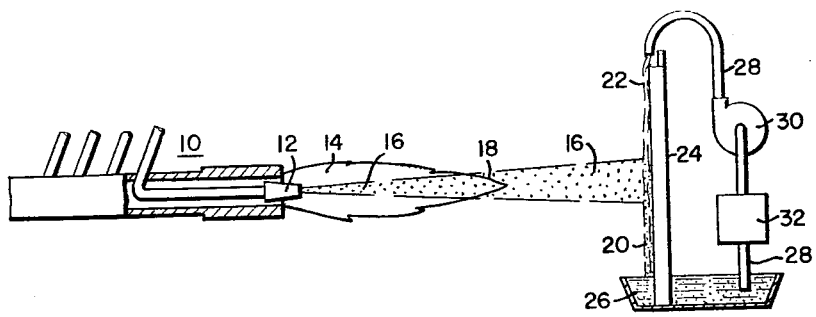

Oct. 3, 1961  B. D. LA MONT  3,002,808
PREPARATION OF ULTRAFINE REFRACTORY OXIDE
Filed Aug. 7, 1957

WITNESSES
Edwin E. Bassler
Wm. B. Sellers

INVENTOR
Bernard D. LaMont
BY Donald Smith
ATTORNEY 3,002,808
PREPARATION OF ULTRAFINE REFRACTORY
OXIDE
Bernard D. La Mont, Jeannette, Pa., assignor to Westinghouse Electric Corporation, East Pittsburgh, Pa., a corporation of Pennsylvania
Filed Aug. 7, 1957, Ser. No. 676,761
3 Claims. (Cl. 23—14.5)

The present invention relates to methods for producing thorium oxide and other refractory oxides and, more particularly, to methods adapted for producing pulverulent oxides having a very small particle size.

In many applications, it is desirable to employ a refractory oxide, for example, thorium oxide or cerium oxide having very dense particles of extremely small size. In these applications, the oxide frequently is employed in an aqueous or other type slurry or suspension. Desirably the particle size of the oxide is made as small as practical to facilitate suspension thereof. In an optimum condition, the particle size of the oxide is so small that deposition of the slurry particles within the system in which the suspension is employed is greatly reduced or prevented altogether. In adition, a very dense characteristic of the particles is desirable in order to minimize adsorption by the particles of the water or other suspending agent or of erosion and corrosion products formed within the system.

In those applications wherein a slurry or suspension of refractory oxide is being circulated continually throughout the system, the smallness of the particle size becomes even more important to lessening their erosive action upon structural components within the system and contacted by the circulating slurry or suspension. In furtherance of this purpose, it is desired to impart as smooth a surface as possible to the individual oxide particles or to impart a specific contour, for example, a spheroidal contour to the particles. The aforesaid spheroidal configuration serves the added function of reducing or eliminating altogether the accumulation of electrical charges upon the individual particles which otherwise cause the particles to adsorb various ions which frequently are present in solution within the circulating slurry.

It is also desired to produce refractory oxide particles of the class described in which the density thereof approximates the theoretical density of the material and thus any noticeable degree of porosity within the particle is eliminated. The absence of this porosity, of course, prevents the absorption of the various impurities of the system within the body of the individual oxide particles. In these applications, it is also desirable to utilize refractory oxide particles which are completely unreactive in order to prevent agglomeration of the particles or the plating out of individual particles upon adjacent structural components of the system.

In one illustrative example, refractory oxide particles, such as thorium dioxide and uranium dioxide, are utilized to form a circulating slurry for use in a quasihomogeneous nuclear reactive system, such as that described in the copending application of William A. Webb et al., entitled "Reactor Plant," Serial Number 659,004, filed May 14, 1957, and assigned to the assignee of the present application. Briefly then, in the latter example, the aforesaid uranium and thorium dioxides form respectively the fissile and fertile components of the nuclear fuel suspension which is circulated through a reactional vessel of a size sufficient to contain a critical mass of the circulating suspension. From the reactional vessel, the circulating slurry of fissile and fertile isotopes is passed through a number of circulating loops and containing a heat exchanger or other suitable means for extracting, from the circulating fuel, the heat evolved in the chain reaction being sustained within the vessel. The aforesaid dioxides are suspended in an aqueous carrier, for example, deuterium oxide, which additionally serves as a moderator material for slowing the fast neutrons produced in the fissioning process to thermal energies which are most efficient for propagating the chain reaction.

In this type of system, it is essential to prevent the uranium and thorium dioxides from settling out or caking in various parts of the system in order to maintain an adequate concentration thereof within the reactional vessel. Moreover, to minimize maintenance of this system, which is sealed hermetically, it is desirable to reduce the erosive effects of these refractory oxides insofar as possible. As indicated heretofore, this is accomplished by employing pulverulent dioxides having very small, but extremely dense, particles. Moreover, the provision of particles approximating theoretical density minimizes or eliminates altogether the absorption by the particles of the various fissional by-products of the chain reaction, which byproducts tend to poison the chain reaction.

In other applications pulverulent oxide particles are employed in various polishes for use particularly for optical glassware. In order to impart the desired surface to the glassware, it is essential that the particles be made as finely divided as possible and that the contour of the individual particles be free from irregular or sharp projections. A particularly useful oxide for this purpose is cerium oxide.

In view of the foregoing, an object of the invention is to furnish a novel and efficient method of producing thorium dioxide, cerium oxide or other refractory oxide.

Other objects of the invention are the provision of methods for producing pulverulent thorium dioxide or other refractory oxides whose particles are very dense and are extremely small in size.

A further object of the invention is the provision of a method for forming pulverulent refractory oxide, the individual particles of which have a smooth surface and are spheroidal in contour.

Still another object of the invention is to provide a method for producing pulverulent thorium dioxide or other refractory oxide wherein porosity has been substantially reduced in the individual particles thereof.

Another object of the invention is to provide methods for making refractory oxides having particle sizes in the ultrafine or colloidal range.

Still another object of the invention is to provide methods for making refractory oxides adapted for uses inter alia, in an optical polish and for forming a relatively non-settling or non-caking suspension thereof in a suitable carrier.

Figure 2:
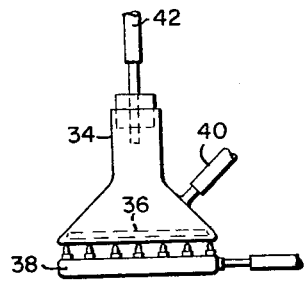

These and other objects, features and advantages of the invention will be made apparent as this description proceeds, with the description being taken in conjunction with the accompanying drawings wherein:

FIG. 1 is an arrangement of apparatus employed in an exemplary method of the invention, and FIG. 2 is an arrangement of apparatus employed in another exemplary method of the invention.

In accordance with the exemplary methods of the invention, an aqueous solution of a soluble compound containing the element, for example, cerium or thorium, to be converted to the oxide or alternatively a slightly comminuted portion of another compound containing the same, is heated to a temperature in excess of 1150° C. whereupon the compound decomposes to form the desired refractory oxide. It has been found that when temperatures in excess of 1150° C. are employed the particles of the resulting refractory oxide are endowed with an extremely small size and are very dense in consistency, with the density approaching the theoretical value for the oxide. The range of particle sizes contemplated by the invention are denoted as "ultrafine" and in size are 0.1 to 0.01 micron, and thus are in the neighborhood of colloidal particle size.

In one example of the invention adapted for the production of the aforementioned thorium dioxide, a solution of soluble thorium compound was prepared by mixing 100 grams of the compound, for example thorium nitrate (Th(NO$_3$)$_4$·4H$_2$O) or thorium chloride (ThCl$_4$·8H$_2$O), with 500 cubic centimeters of deionized water. The solution should be a dilute as is consistent with obtaining production quantities and therefore should contain ten to twenty percent by weight of the soluble compound. The solution thus obtained was then sprayed through a high temperature flame. Suitable flame temperatures are obtained with oxygen-acetylene (2800° C.), oxygen-hydrogen (3000° C.) or oxygen-cyanogen (4500° C.), with the temperature given being nominal. As a result, the droplets of thorium compound solution entering the flame are not only decomposed and the thorium constituent thereof converted to the oxide, but the extremely fine thorium dioxide particles formed thereby are at the same time sintered to a spheroidal configuration having a very smooth surface.

In one arrangement for carrying out this method of the invention, the solution of thorium or other refractory compound is sprayed through a spray gun 10 such as that used in flame spraying molten metal. Thus the solution is emitted from a central nozzle 12 into the cooler portion of the flame as indicated by reference character 14. Thence spray 16 travels generally through the tip or hottest portion 18 of the flame. During its travel within the flame the thorium compound contained within the fine droplets of the solution is converted into ultrafine particles of thorium oxide which are then at least partially fused in the hottest portion of the flame. Upon leaving the flame the particles of thorium oxide now contained within the spray 16 are collected, for example, by means of a well-known water curtain 20. The water curtain is formed by a continuous flow 22 of water flowing over the adjacent surface of a suitable supporting member 24. The water thus flowing and the particles collected therein are caught by a container 26. From the container the water is returned to the top of the supporting member 24 by a conduit 28 and pump 30. The water thus returned is decanted off the particles remaining in the container 26, or alternately a suitable filter 32 is coupled in the conduit 28 for this purpose and is inserted between the pump 30 and the lower end of the conduit 28.

The fusing or sintering of the particles within the flame not only produces particles having very nearly theoretical density but in addition imparts a smooth surface to the particles. As indicated heretofore, the smooth and dense characteristics of the particles thus produced minimizes the absorption and adsorption of foreign matter relative to the particles. The size of the ultrafine spheroidal particles thus obtained is of the order of 0.1 micron or less. Obviously, this method can be adapted with equal facility to the production of cerium oxide or other refractory oxides. In the case of cerium, suitable starting compounds are the acetate or the chloride of cerium.

In another example of the invention, a hydrate of thorium tetrachloride, nominally ThCl$_4$·8H$_2$O, or cerium tetrachloride (CeCl$_4$·xH$_2$O) is comminuted slightly for ease of handling. It has been found that upon heating the aforementioned hydrate of thorium tetrachloride to approximately 500° C. for 30 minutes the crystalline structure thereof changes to a greatly expanded amorphous form. It is postulated that the aforesaid expansion results from the elimination of the water molecules from the crystalline structure of the hydrate and at least partial conversion of the thorium or cerium to the corresponding oxide. When the thorium or cerium compound is fully expanded, additional heat is supplied thereto to bring the compound to a temperature of at least 1150° C. The heat is continued for fifteen minutes or until all of the oxide reaches the aforesaid temperature and entirely is converted to an ultrafine particle size. Slightly improved results are obtained by heating the oxide thus formed to at least 1450° C. Light grinding is required in some cases fully to separate the oxide particles. The additional heating step improves the density and smooth surface characteristics of the particles.

The aforesaid expansion and conversion of the cerium or thorium tetrachloride is accelerated by the addition of steam as these compounds are being heated at 500° C. as aforesaid. The use of steam operates to drive the following reaction to the right.

$$\text{ThCl}_4 + 2\text{H}_2\text{O} \xrightarrow{\text{steam}} \text{ThO}_2 + 4\text{HCl}$$

$$\text{CeCl}_4 + 2\text{H}_2\text{O} \xrightarrow{\text{steam}} \text{CeO}_2 + 4\text{HCl}$$

In the absence of steam, the water molecules of the above equations are supplied entirely by the water of crystallization of the starting compounds. Thus when adding steam, anhydrous compounds can be employed.

In an illustrative example of the latter method, as shown in FIG. 2, approximately 50 grams of thorium or cerium chloride was placed in a suitable flask 34 to form a layer 36 approximately one-quarter inch thick at the bottom thereof. The contents of the flask initially were heated to about 500° C. with a suitable heating unit, for example, a gas burner 38. At the same time steam was introduced into the flask 34 by means of inlet and outlet conduits 40 and 42, respectively. After heating for about thirty minutes, the contents of the flask 34 were removed and baked in a furnace (not shown) for fifteen minutes at 1450° C. At this temperature the oxide particles are densified to render them comparatively non-adsorbent. It will be appreciated that the times indicated above will require adjustment in accordance with the quantity of starting material.

The size of the ultrafine particles thus obtained is of the order of .01 micron or less. When employed in the slurry described heretofore, these very small particles are suspended easily within the carrier liquid and do not settle fully when undisturbed. It has been found that even though the suspension has been left standing for a period of several weeks, that the thorium dioxide particles can be redistributed immediately throughout the suspension by a comparatively small amount of stirring. Moreover, the extreme fineness of these particles greatly reduces the erosive characteristics thereof and eliminates any tendency to cake or compact when left standing.

When employed as an optical polish, as noted above, the ultrafine and uniform size of the particles imparts the required surface to the article being polished without danger of scratching. No prior milling is required to reduce unwanted surface projections of the particles.

In view of the foregoing, it will be apparent that novel and efficient methods have been disclosed herein for producing thorium or cerium oxide or other refractory oxides and particularly oxides of the character described having ultrafine particle sizes. Although the methods have been described primarily in connection with cerium and thorium oxides, it will be apparent that these methods can be adapted with relative ease for producing other ultrafine refractory oxides.

Accordingly, numerous modifications of the invention will appear to those skilled in the art without departing from the spirit and scope of the invention. Moreover, it is to be understood that certain features of the invention can be employed without a corresponding use of other features thereof.

Therefore, what is claimed as new is:

1. A method for producing an ultrafine metallic oxide from the group consisting of thorium oxide, uranium oxide, and cerium oxide, said method comprising the steps of dissolving in water a water soluble compound of the corresponding metal, injecting a fine spray of the solution thus obtained into the interior of a flame having a temperature sufficient to vaporize the aqueous portions of said solution and to convert said soluble compound to its corresponding oxide, directing said spray substantially axially through said flame, flowing a curtain of water transversely of said flame at a position adjacent the tip of the flame, said spray and said flame being directed generally toward said curtain, and said spray in addition being injected with sufficient velocity to carry particles thereof through said flame and to carry particles of said oxide to said curtain.

2. A method for producing an ultrafine metallic oxide from the group consisting of thorium oxide and cerium oxide, said method comprising the steps of dissolving in water a compound from the group consisting of thorium nitrate, thorium chloride, cerium acetate and cerium chloride, injecting a fine spray of the solution thus obtained into the interior of a flame having a temperature sufficient to vaporize the aqueous portions of said solution and to convert said soluble compound to its corresponding oxide, directing said spray generally axially of said flame, flowing a curtain of water transversely to said flame at a position adjacent the tip of the flame, said spray and said flame being directed generally toward said curtain, and said spray in addition being injected with sufficient velocity to carry particles of the solution through said flame and to carry particles of said oxide to said curtain.

3. A method for producing an ultrafine metallic oxide from the group consisting of thorium oxide, uranium oxide, and cerium oxide, said method comprising the steps of dissolving in water less than 30% by weight of a water soluble compound of the corresponding metal, injecting a fine spray of the solution thus obtained into the interior of a flame having a temperature sufficient to vaporize the aqueous portions of said solution and to convert said soluble compound to its corresponding oxide, directing said spray generally axially of said flame, flowing a curtain of water transversely of said flame at a position adjacent the tip of the flame, said spray and said flame being directed generally toward said curtain, said spray in addition being injected with sufficient velocity to carry particles of the solution through said flame and to carry particles of said oxide to said curtain.

References Cited in the file of this patent

UNITED STATES PATENTS

| | | |
|---|---|---|
| 1,646,734 | Marden | Oct. 25, 1927 |
| 1,816,388 | Mittasch et al. | July 28, 1931 |
| 1,850,286 | Mittasch et al. | Mar. 22, 1932 |
| 2,155,119 | Ebner | Apr. 18, 1939 |

FOREIGN PATENTS

| | | |
|---|---|---|
| 661,685 | Great Britain | Nov. 28, 1951 |
| 707,389 | Great Britain | Apr. 14, 1954 |

OTHER REFERENCES

Proceedings of the International Conference on the Peaceful Uses of Atomic Energy, vol. 9, August 8–20, 1955. United Nations, 1956, pp. 170–172.

Ser. No. 379,872, Ebner II (A.P.C.), published April 27, 1943.